(12) United States Patent
Tsukamoto

(10) Patent No.: US 7,894,804 B2
(45) Date of Patent: Feb. 22, 2011

(54) COMMUNICATION DEVICE AND METHOD FOR CONTROLLING

(75) Inventor: Akihito Tsukamoto, Tachikawa (JP)

(73) Assignee: Fujitsu Toshiba Mobile Communications Limted, Kawsaki (JP)

( * ) Notice: Subject to any disclaimer, the term of this patent is extended or adjusted under 35 U.S.C. 154(b) by 971 days.

(21) Appl. No.: 11/790,584

(22) Filed: Apr. 26, 2007

(65) Prior Publication Data

US 2007/0201653 A1   Aug. 30, 2007

Related U.S. Application Data

(60) Division of application No. 11/455,692, filed on Jun. 20, 2006, now Pat. No. 7,272,384, which is a continuation of application No. 09/995,637, filed on Nov. 29, 2001, now abandoned.

(30) Foreign Application Priority Data

Nov. 30, 2000   (JP)   ............................. 2000-365517

(51) Int. Cl.
   *H04M 3/42*   (2006.01)
(52) U.S. Cl. ........................ 455/415; 455/416; 455/417; 455/412; 379/355.02; 379/355.03; 379/356.01
(58) Field of Classification Search ................. 455/415, 455/416, 417, 412.1, 414.1; 379/355.02, 379/355.03, 356.01
See application file for complete search history.

(56) References Cited

U.S. PATENT DOCUMENTS

| 5,422,938 | A | 6/1995 | Yamanishi |
| 5,889,799 | A | 3/1999 | Grossman et al. |
| 6,289,226 | B1 | 9/2001 | Lekven et al. |
| 6,298,128 | B1 | 10/2001 | Ramey et al. |
| 6,516,202 | B1 | 2/2003 | Hawkins et al. |
| 6,519,479 | B1 | 2/2003 | Garudadri et al. |
| 6,587,691 | B1 | 7/2003 | Granstam et al. |
| 7,051,044 | B1 | 5/2006 | Fera et al. |
| 2001/0012347 | A1 | 8/2001 | Fujino et al. |
| 2001/0012351 | A1 | 8/2001 | Shaffer et al. |

FOREIGN PATENT DOCUMENTS

| JP | 11-164003 | 6/1999 |
| JP | 11-177675 | 7/1999 |

OTHER PUBLICATIONS

Office Action issued Aug. 18, 2008, in Japanese Application No. 2000-365517 (3 pages) with English translation (3 pages).

*Primary Examiner*—Tuan A Pham
(74) *Attorney, Agent, or Firm*—Workman Nydegger

(57) ABSTRACT

A communication device comprises a first memory which stores telephone books, each including identification information and a name of a communication party, a second memory which stores communication histories, each including a communication time and identification information and a name of a communication party, a changing device which changes a telephone book stored in the first memory, and a control device which, when the telephone book is changed, changes a communication history stored in the second memory in accordance with a content of change.

19 Claims, 16 Drawing Sheets

| NAME | TELEPHONE NO. | CALL ORIGINATION FLAG | CALL RECEPTION FLAG | ELECTRONIC MAIL ADDRESS | MAIL TRANSMISSION FLAG | MAIL ARRIVAL FLAG | |
|---|---|---|---|---|---|---|---|
| Tarou SATOH | 09012345678 → 09012345677 | 1 → 0 | 1 | sato@aaa.ne.jp | 1 | 0 | STEP17A |
| Hanako YAMADA | 07012345678 | 0 | 1 | yamada@bbb.co.jp | 0 | 1 | |
| Jiroh YAMAMOTO | 07087654321 | 0 | 0 | yamamo@ccc.or.jp | 1 | 1 | |
| Yoshiko SUZUKI | 0312345678 | 1 | 0 | suzuki@ddd.ne.jp | 0 | 1 | |
| Saburoh TAKAHASHI | 0387654321 | 0 | 1 | taka@eee.co.jp | 1 | 0 | |
| Akiko TANAKA → Akiko SHIMIZU | 09087654321 | 1 | 0 | tanaka@fff.or.jp | 0 | 0 | STEP15A |
| Kazuo KATOH | 0355555555 | 1 | — | kato@kk.or.jp | — | — | STEP16A |
| ... | ... | ... | ... | ... | ... | ... | |

| NAME | TELEPHONE NO. | ORIGINATION TIME | CALL ORIGINATION HISTORY FLAG | |
|---|---|---|---|---|
| Yoshiko SUZUKI | 0312345678 | 2000.12.10 13:10 | 1 | ~60B |
| — | 09011111111 | 2000.12.10 15:33 | 0 | |
| — | 07099999999 | 2000.12.10 16:10 | 0 | |
| Akiko TANAKA ↓ Akiko SHIMIZU | 09087654321 | 2000.12.11 01:05 | 1 | STEP15C |
| Tarou SATOH ↓ — | 09012345678 | 2000.12.11 08:45 | 1 ↓ 0 | STEP17C |
| — ↓ Kazuo KATOH | 0355555555 | 2000.12.12 10:20 | 0 ↓ 1 | STEP16C |
| — | 0427765301 | 2000.12.13 09:20 | 0 | |
| — ↓ Tarou SATOH | 09012345677 | 2000.12.24 07:00 | 0 ↓ 1 | STEP17E |
| ⋮ | ⋮ | ⋮ | ⋮ | |

FIG. 3

| NAME | TELEPHONE NO. | CALL RECEPTION TIME | CALL RECEPTION HISTORY FLAG | |
|---|---|---|---|---|
| Saburoh TAKAHASHI | 0387654321 | 2000.12.09 10:30 | 1 | ~60C |
| Hanako YAMADA | 07012345678 | 2000.12.10 11:12 | 1 | |
| — | 09022222222 | 2000.12.10 23:10 | 0 | |
| — | NON-NOTIFIED | 2000.12.10 23:24 | 0 | |
| Taroh SATOH | 09012345678 | 2000.12.11 10:09 | 1 | |
| — | 04277777777 | 2000.12.11 17:55 | 0 | |
| — | NON-NOTIFIED | 2000.12.12 21:33 | 0 | |
| ⋮ | ⋮ | ⋮ | ⋮ | |

FIG. 4

| NAME | ELECTRONIC MAIL ADDRESS | MAIL TRANSMISSION TIME | MAIL TRANSMISSION HISTORY FLAG |
|---|---|---|---|
| — | abc@xxx.co.jp | 2000.12.08 10:40 | 0 |
| Taroh SATOH | sato@aaa.ne.jp | 2000.12.08 14:13 | 1 |
| Jiroh YAMAMOTO | yamamo@ccc.or.jp | 2000.12.09 07:11 | 1 |
| — | xyz@yyy.ne.jp | 2000.12.10 10:20 | 0 |
| Saburoh TAKAHASHI | taka@eee.co.jp | 2000.12.11 09:20 | 1 |
| ⋮ | ⋮ | ⋮ | ⋮ |

| NAME | ELECTRONIC MAIL ADDRESS | MAIL ARRIVAL TIME | MAIL ARRIVAL HISTORY FLAG |
|---|---|---|---|
| Yoshiko SUZUKI | suzuki@ddd.ne.jp | 2000.12.07 22:05 | 1 |
| Jiroh YAMAMOTO | yamamo@ccc.or.jp | 2000.12.08 15:21 | 1 |
| — | zzz@sss.ne.jp | 2000.12.11 20:04 | 0 |
| Hanako YAMADA | yamada@bbb.co.jp | 2000.12.12 18:22 | 1 |
| ⋮ | ⋮ | ⋮ | ⋮ |

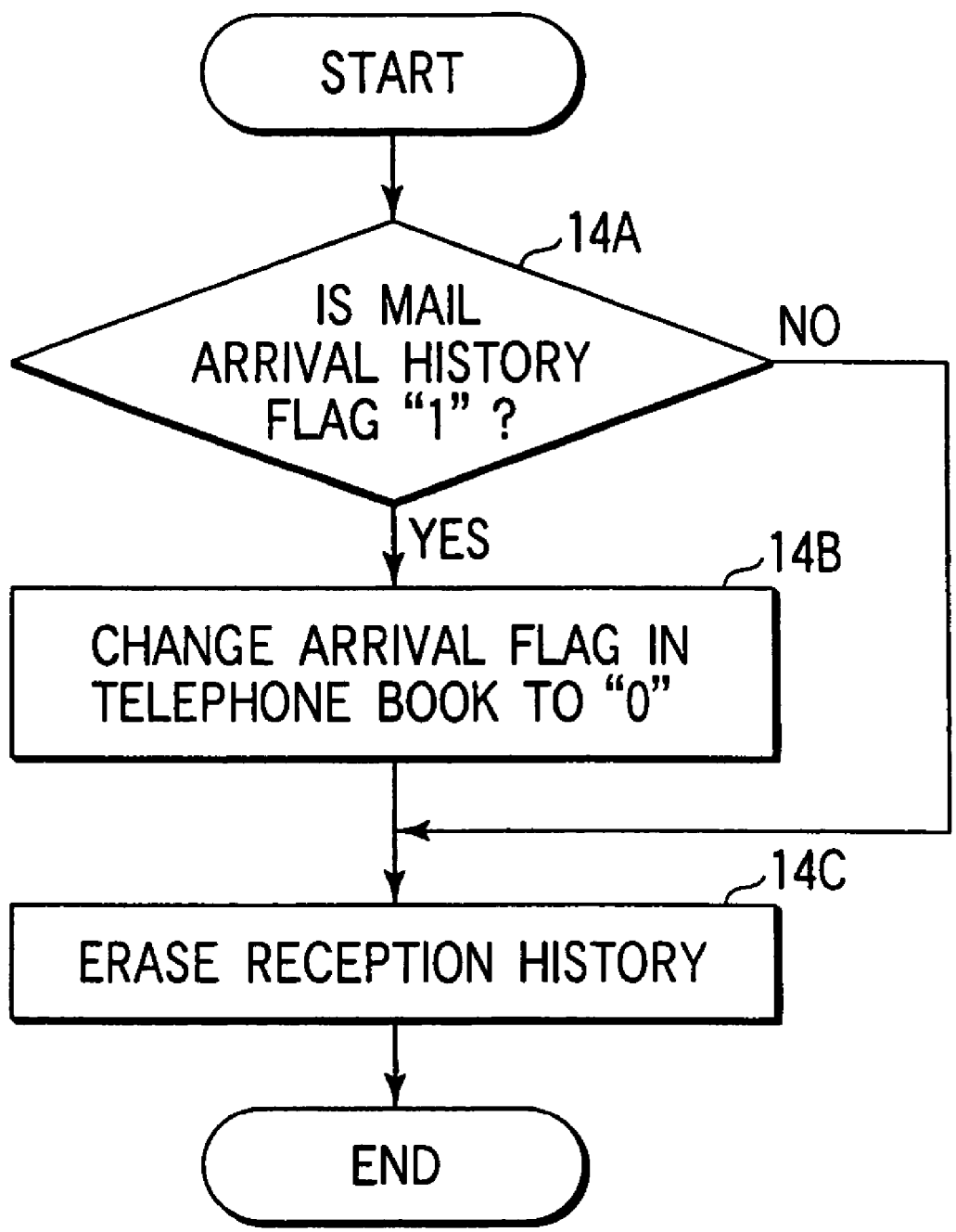
F I G. 14

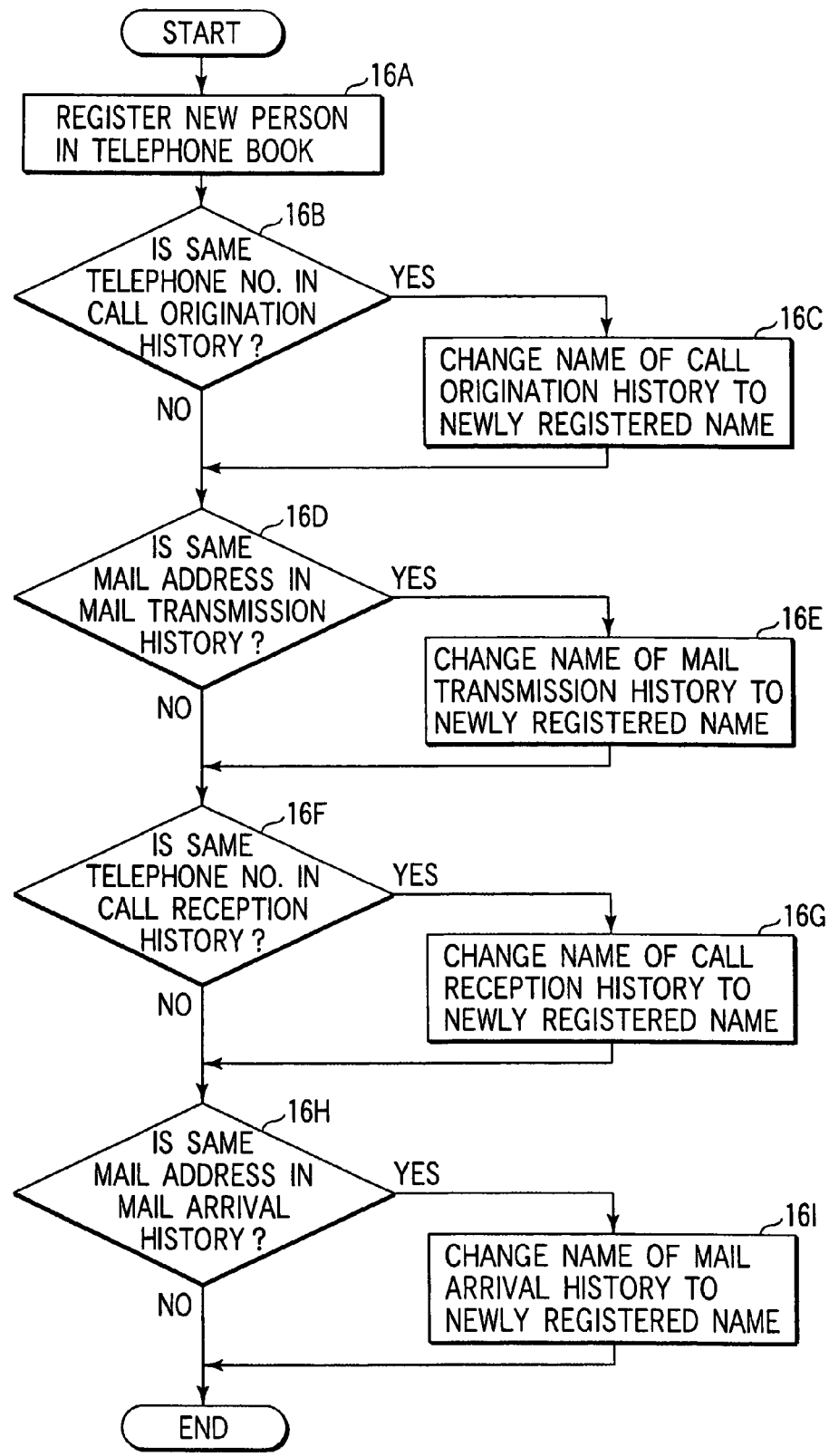
F I G. 16

COMMUNICATION DEVICE AND METHOD FOR CONTROLLING

CROSS-REFERENCE TO RELATED APPLICATIONS

This is a divisional application of and claims benefit of application Ser. No. 11/455,692, filed Jun. 20, 2006, now U.S. Pat. No. 7,272,384, which is a continuation of and claims benefit of application Ser. No. 09/995,637, filed Nov. 29, 2001, now abandoned, and which is based upon and claims the benefit of priority from the prior Japanese Patent Application No. 2000-365517, filed Nov. 30, 2000, the entire contents of all of which are incorporated herein by reference.

BACKGROUND OF THE INVENTION

1. Field of the Invention

The present invention relates to a communication device used in a mobile communication system such as a cellular phone or a fixed communication system such as a subscriber telephone connected to a wired communication network, and a method for controlling the same.

2. Description of the Related Art

As well known, a cellular phone of a mobile telephone system or a subscriber telephone connected to a wired public network has a telephone book facility of storing a telephone number of a person as correlated with his name and a history storage facility of storing call origination and call reception histories.

By the telephone book facility, when someone's name is entered or retrieved, his or her telephone number can be read out to call him without entering his or her telephone number.

The history storage facility comprising a call origination history storage facility and a call reception history storage facility. The call origination history storage facility stores, in a set, a call origination time, a call destination's name (blank if it is not registered in the telephone book), and his or her telephone number, while the call reception history storage facility stores, in a set, a call reception time, a caller's name (blank if it is not registered in the telephone book), and his or her telephone number. The history is displayed in a set of a time and a name. When a call is originated on the history display screen, it is sent to a telephone number related to a displayed history.

By a conventional communication device used in a mobile communication system or a fixed communication system, however, when the telephone book facility is updated with changing a name correlated with his or her telephone number, there will be disagreement between a name in a telephone book database and a name in the communication history, which in turn gives a mismatch between the name in the displayed history and an actual name, so that a call cannot be originated for a desired destination if it is originated from the displayed history.

Furthermore, when a communication history is created and then a telephone number in the database of the telephone book facility is updated, the same name is correlated to different telephone numbers in the database of the telephone book facility and that of the history storage facility. In this case also, if a call is originated on the basis of the history information, problematically it is sent to the previous telephone number.

Moreover, the above-mentioned communication device, which has recently been provided with an electronic mail transmission/arrival facility, suffers from a similar problem when this facility is used to update an electronic mail address or the corresponding name.

BRIEF SUMMARY OF THE INVENTION

It is an object of the present invention to provide a communication device storing a communication history including identification information and a name of a communication party, and a communication time, and also a telephone book including the identification number and the name and in which the communication history is correspondingly updated when the telephone book is updated, thereby improve the convenience of the communication history.

It is another object of the present invention to provide a method for controlling the communication device.

According to an embodiment of the present invention, when the telephone book is updated, at least one of identification information and a name of a communication party of the corresponding communication history is updated.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 2 is an illustration for explaining a telephone book stored in a telephone book storage area of the communication device of the embodiment;

FIG. 3 is an illustration for explaining a call origination history stored in a call origination history storage area of the communication device of the embodiment;

FIG. 4 is an illustration for explaining a call reception history stored in a call reception history storage area of the communication device of the embodiment;

FIG. 5 is an illustration for explaining a mail transmission history stored in a mail transmission history storage area of the communication device of the embodiment;

FIG. 6 is an illustration for explaining a mail arrival history stored in a mail arrival history storage area of the communication device of the embodiment;

FIG. 14 is a flowchart for showing the processing carried out when a mail arrival history of the communication device of the embodiment is deleted;

FIG. 16 is a flowchart for describing processing carried out when new data is registered in the telephone book of the communication device of the embodiment;

DETAILED DESCRIPTION OF THE INVENTION

An embodiment of a communication device according to the present invention will now be described with reference to the accompanying drawings.

Figure 1:
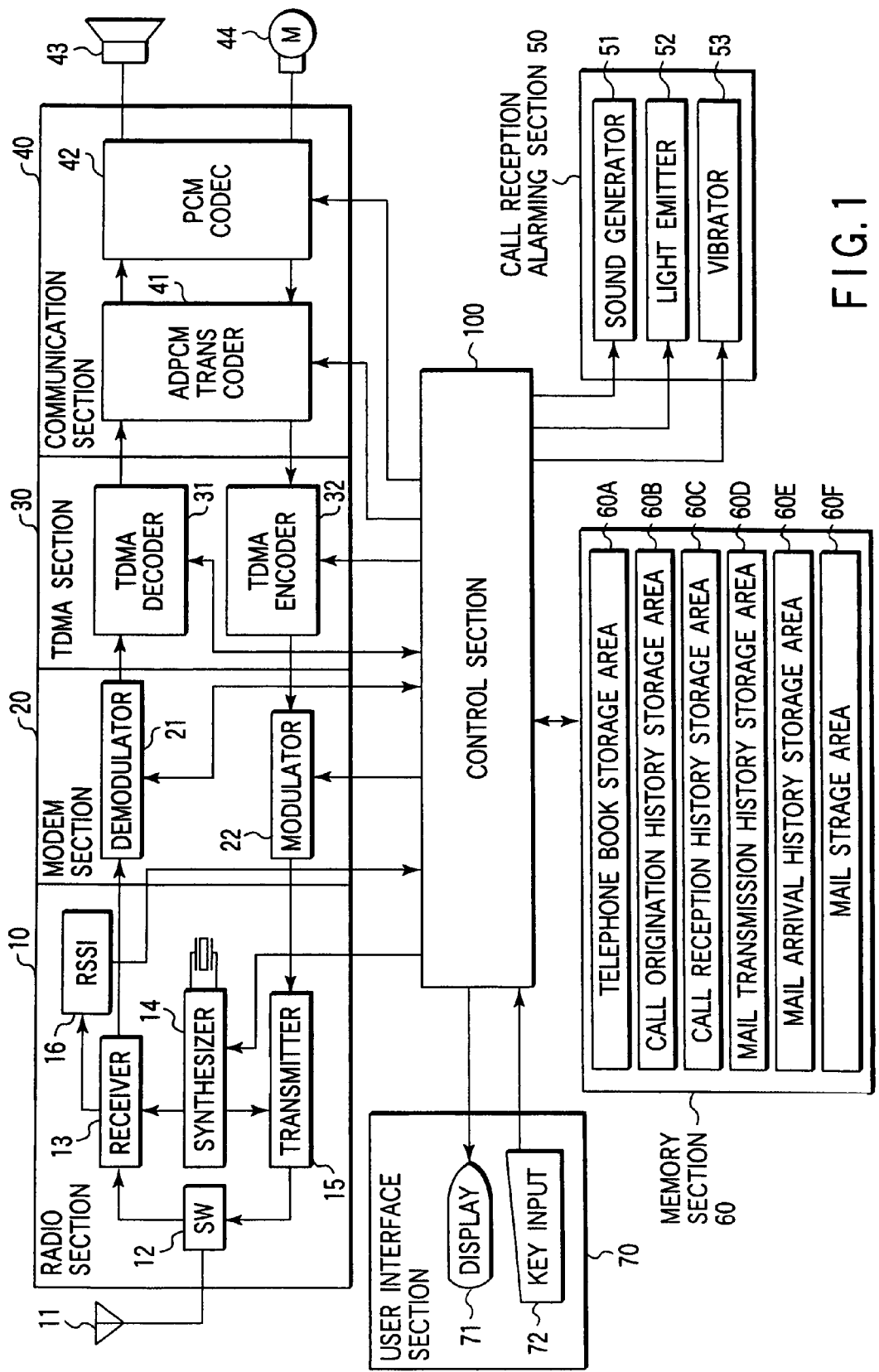
FIG. 1 is a block diagram for showing a circuit configuration of one embodiment of a communication device according to the present invention.

FIG. 1 shows a configuration of a communication device related to one embodiment of the present invention, exemplifying a mobile communication device which carries out radio communication with a base station (not shown) by TDMA (Time Division Multiple Access).

The mobile communication device shown here comprises a radio section 10 equipped with an antenna 11, MODEM section 20, TDMA section 30, communication section 40 equipped with a speaker 43 and microphone 44 (M), call reception alarming section 50, memory section 60, user interface section 70, and control section 100.

A radio frequency signal sent via a radio communication channel from a base station connected to a mobile communication network is received at the antenna 11 and then input to a receiver 13 through a high frequency switch (SW) of the radio section 10.

At the receiver 13, the received radio frequency signal is mixed with a reception local oscillation signal generated by a frequency synthesizer 14 to be frequency-converted into an intermediate reception frequency signal.

Note here that the frequency of the reception local oscillation signal generated by the frequency synthesizer 14 is controlled by the control section 100 based on a radio channel frequency. The radio section 10 comprises a reception field intensity detector (RSSI) 16.

This reception field intensity detector 16 detects a reception field intensity (hereinafter abbreviated as RSSI) of a radio frequency signal, a detected value of which is supplied to the control section 100.

The intermediate reception frequency signal output from the receiver 13 is input to a demodulator 21 of the MODEM section 20. At the demodulator 21, digital demodulation is conducted on the intermediate reception frequency signal, thus reproducing a digital communication signal. Note that the mobile communication device of the embodiment can transmit/receive a call as well as an electronic mail.

A TDMA decoder 31 of the TDMA section 30 divides the digital communication signal for each time slot in accordance with an instruction from the control section 100. Of a plurality of thus divided digital communication sub-signals, a digital communication sub-signal of a slot assigned to its own machine is extracted by the TDMA decoder 31. The TDMA decoder 31 also separates a speech signal and a mail signal from the communication sub-signal. The speech signal is supplied to the communication section 40 and the mail signal is supplied to a controller 100.

The communication section 40 comprises an adaptive differential PCM (ADPCM) transcoder 41 and a PCM codec 42, by which the digital speech signal is sequentially demodulated through these adaptive differential PCM transcoder 41 and PCM codec 42 to be reproduced as an analog speech signal. This analog speech signal is amplified by a reception amplifier not shown, to be audibly output loudly from the speaker 43.

A transmission speech input to the microphone 44, is sequentially coded through the PCM codec 42 and the adaptive differential PCM transcoder 41 to provide a digital speech signal, which is then input to a TDMA encoder 32. An electronic mail signal from the controller 100 is also supplied to the TDMA encoder 32.

At the TDMA encoder 32, the digital speech signal output from the adaptive differential PCM transcoder 41 is inserted into a time slot indicated by the control section 100 and input to the modulator 22. The mail signal is also inserted into a time slot indicated by the control section 100 and input to the modulator 22.

The modulator 22 conducts digital modulation on a carrier signal of the digital communication signal including the speech signal and mail signal based on the digital communication signal. Thus, a modulated carrier signal is input to a transmitter 15.

At the transmitter 15, the modulated carrier signal is mixed with a transmission local oscillation signal generated by the frequency synthesizer 14 to be frequency-converted into a signal having a radio channel frequency indicated by the control section 100 and then amplified to a predetermined transmission power level. The radio frequency signal thus frequency-converted and signal-amplified at the transmitter 15 is transmitted via the high frequency switch 12 from the antenna 11 to the base station.

Upon a call (or mail) is received, the call (or mail) reception alarming section 50 alarms the user about the call (or mail) reception under the control of the control section 100, comprising a sounder generator 51 for raising an audible sound for alarming, a light emitter 52 for emitting light for alarming, and a vibrator 53 for vibrating, for example, an eccentric motor for alarming.

The memory section 60 uses as a storage medium such a semiconductor memory as a ROM or RAM for storing the control program of the control section 100, ID data of one own machine necessary for authentication, various kinds of control data, and various kinds of set data and comprises a telephone book storage area 60A, call origination history storage area 60B, call reception history storage area 60C, mail transmission history storage area 60D, and mail arrival history storage area 60E.

The telephone book storage area 60A is used to store a telephone book including, as shown in FIG. 2, a communication party's name associated with his or her telephone number, call origination flag indicating presence/non-presence of history data of call origination for him or her (in the call origination history storage area 60B), call reception flag indicating presence/non-presence of history data of call reception from him or her (in the call reception history storage area 60C), electronic mail address, mail transmission flag indicating presence/non-presence of history data of mail transmission for him or her (in the mail transmission history storage area 60D), and mail reception flag indicating presence/non-presence of history data of mail arrival from him or her (in the mail arrival history storage area 60E).

The call origination history storage area 60B stores a call origination history including, as shown in FIG. 3, a call destination's name associated with his or her telephone number, call origination time, and call origination history flag indicating presence/non-presence of a call destination's telephone number in the telephone book storage area 60A. If the party's name is not registered in the telephone book, the name field is blank, so that the origination history flag is set to "0."

The call reception history storage area 60C stores a call reception history including, as shown in FIG. 4, a call originator's name associated with his or her telephone number supplied through the network upon call reception, call reception time, and call reception history flag indicating presence/non-presence of his or her telephone number in the telephone book storage area 60A. If the caller's name is not registered in the telephone book, the name field is blank, so that the call reception history flag is set to "0." Note here that the present system enables the call originator to select not to notify the network of his or her own telephone number, in which case the telephone number through which a call is arrived is not supplied.

The mail transmission history storage area 60D stores an electronic mail transmission history including, as shown in FIG. 5, a name of an electronic mail transmission destination name associated with his or her electronic mail address, a transmission time, and electronic mail transmission history flag indicating presence/non-presence of this mail address in the telephone book storage area 60A. If the party's name is not registered in the telephone book, the name field is blank, so that the mail transmission history flag is set to "0."

The electronic mail arrival history storage area 60E stores an electronic mail arrival history including, as shown in FIG. 6, a name of a party who transmitted an electronic mail associated with his or her electronic mail address, mail arrival time, and mail arrival history flag indicating presence/non-presence of this mail address in the telephone book storage area 60A. If the party's name is not registered in the telephone book, the name field is blank, so that the arrival history flag is set to "0."

The user interface section 70 comprises a display 71 and a key input 72. The display 71 comprises, for example, an LCD (Liquid Crystal Display), indicating visually to the user the state of its own machine (call origination, call reception, mail transmission, mail arrival, remaining battery capacity, reception intensity) or dial data read out from the memory section 60 and text data such as an electronic mail.

The key input 72 has such keys for call origination, call reception, mail transmission, and mail arrival related to usual communication functions as a numeric key pad for entering a dial number as well as other keys for various settings of switching of call reception alarming methods (audible sound raising/light emission/vibrator/no-alarming) and other functions. Note here that these keys can be used also to enter characters when an electronic mail is created.

The control section 100 uses, for example, a microcomputer as its main control, having functions for controlling the various sections related to the above-mentioned TDMA communication and electronic mail transmission/reception, counting the time, controlling the edition of telephone book stored in the memory section 60 upon demanding by the user through the key input 72, and controlling of creation of a transmit electronic mail and display of an arrival electronic mail.

The control section 100 has also functions of, for call origination/reception or electronic mail transmission/arrival, creating a call origination reception history in which a communication party's name and telephone number are associated with the origination/reception time and a mail transmission/arrival history in which a communication party's name and mail address are associated with the transmission/arrival time as well as a control function of updating the history upon edition, updating, or newly registering of the telephone book.

The following will describe the operations of a mobile communication device having the above-mentioned configuration. Note here that the following will specifically describe the operations of creating a call origination/reception history or a mail transmission/arrival history based on the telephone book and the operations of editing, updating, and newly registering the telephone book. These operations are all carried out under the control of the control section 100.

Processing in a case where a call is originated is described as follows. This processing is shown by a flowchart of FIG. 7.

Upon call origination, at step 7A, a call origination time is obtained from the current time and this origination time and a call destination's telephone number are associated with each other and newly recorded in the call origination history storage area 60B as a call origination history.

Note here that when the number of call origination histories reaches a predetermined value, the least recent call origination history is deleted from the call origination history storage area 60B. This processing is detailed later with reference to FIG. 11.

At step 7B, it is determined whether the call destinations telephone number is recorded in the telephone book storage area 60A.

If the call destination's telephone number is recorded in the telephone book storage area 60A, the flow goes to step 7C and, otherwise, goes to step 7E.

At step 7C, a name which corresponds to the call destination's telephone number is read out from the telephone book storage area 60A and it is recorded in a name field in the call origination history storage area 60B that corresponds to the call origination history recorded at step 7A.

At step 7D, a call origination history flag in the call origination history storage area 60B that corresponds to the call origination history recorded at step 7A is set to "1" and a call origination flag in the telephone book storage area 60A that corresponds to the name read out at step 7C is also set to "1." Then, the processing ends.

At step 7E, on the other hand, a call origination history flag in the call origination history storage area 60B that corresponds to the call origination history recorded at step 7A is set to "0." Then, the processing ends.

Next, processing in a case where an electronic mail is transmitted is described as follows. This processing is shown by a flowchart of FIG. 8.

Upon electronic mail transmission, at step 8A, a transmission time is obtained from the current time and this transmission time and a mail destination's electronic mail address are associated with each other and newly recorded in the mail transmission history storage area 60D as a mail transmission history.

Note here that when the number of the mail transmission histories reaches a predetermined value, the least recent mail transmission history is deleted from the mail transmission history storage area 60D. This processing is detailed later with reference to FIG. 12.

At step 8B, it is determined whether the mail destination's electronic mail address is recorded in the telephone book storage area 60A.

If the mail destination's electronic mail address is recorded in the telephone book storage area 60A, the flow goes to step 8C and, otherwise, goes to step 8E.

At step 8C, a name that corresponds to the mail destination's electronic mail address is read out from the telephone book storage area 60A and it is recorded in a name field in the mail transmission history storage area 60D that corresponds to the mail transmission history recorded at step 8A.

At step 8D, a mail transmission history flag in the mail transmission history storage area 60D that corresponds to the mail transmission history recorded at step 8A is set to "1" and a mail transmission flag in the telephone book storage area 60A that corresponds to the name read out at step 8C is also set to "1." Then, the processing ends.

At step 8E, on the other hand, a mail transmission history flag in the mail transmission history storage area 60D that corresponds to the mail transmission history recorded at step 8A is set to "0." Then, the processing ends.

Next, processing in a case where an electronic mail is arrived is described as follows. This processing is shown by a flowchart of FIG. 9.

Upon call reception, at step 9A, a call reception time is obtained from the current time and this call reception time and a caller's telephone number (originator's telephone number) supplied from the network upon call reception are associated with each other and newly recorded in the call reception history storage area 60C as a call reception history.

Note here that the number of call reception histories reaches a predetermined value, the least recent call reception history is deleted from the call reception history storage area 60C. This processing is detailed later with reference to FIG. 13.

At step 9B, it is determined whether the caller's telephone number is recorded in the telephone book storage area 60A.

If the caller's telephone number is recorded in the telephone book storage area 60A, the flow goes to step 9C and, otherwise, goes to step 9E.

At step 9C, a name that corresponds to the caller's telephone number is read out from the telephone book storage area 60A and it is recorded in a name field in the call reception history storage area 60C that corresponds to the call reception history recorded at step 9A.

At step 9D, a call reception history flag in the call reception history storage area 60C that corresponds to the call reception history recorded at step 9A is set to "1" and a call reception flag in the telephone book storage area 60A that corresponds to the name read out at step 9C is also set to "1." Then, the processing ends.

At step 9E, on the other hand, a call reception history flag in the call reception history storage area 60C that corresponds to the call reception history recorded at step 9A is set to "0." Then, the processing ends.

Next, processing in a case where an electronic mail is arrived. This processing is shown by a flowchart of FIG. 10.

Upon mail arrival, at step 10A, a mail arrival time is obtained from the current time and a mail sender's electronic mail address is obtained from the arrived mail. The mail arrival time and sender's electronic mail address are associated with each other and newly recorded in the mail arrival history storage area 60E as, a mail arrival history.

Note here that if the number of the mail arrival histories reaches a predetermined value, the least recent mail arrival history is deleted from the mail arrival history storage area 60E. This processing is detailed later with reference to FIG. 14.

At step 10B, it is determined whether the sender's electronic mail address is recorded in the telephone book storage area 60A.

If the sender's mail address is recorded in the telephone book storage area 60A, the flow goes to step 10C and, otherwise, goes to step 10E.

At step 10C, a name that corresponds to the sender's mail address is read out from the telephone book storage area 60A and it is recorded in a name field in the mail arrival history storage area 60E that corresponds to the mail arrival history recorded at step 10A.

At step 10D, a mail arrival history flag in the mail arrival history storage area 60E that corresponds to the mail arrival history recorded at step 10A is set to "1" and a mail arrival flag in the telephone book storage area 60A that corresponds to the name read out at step 10C is also set to "1." Then, the processing ends.

At step 10E, on the other hand, a mail arrival history flag in the mail arrival history storage area 60E that corresponds to the mail arrival history recorded at step 10A is set to "0." Then, the processing ends.

Figure 11:
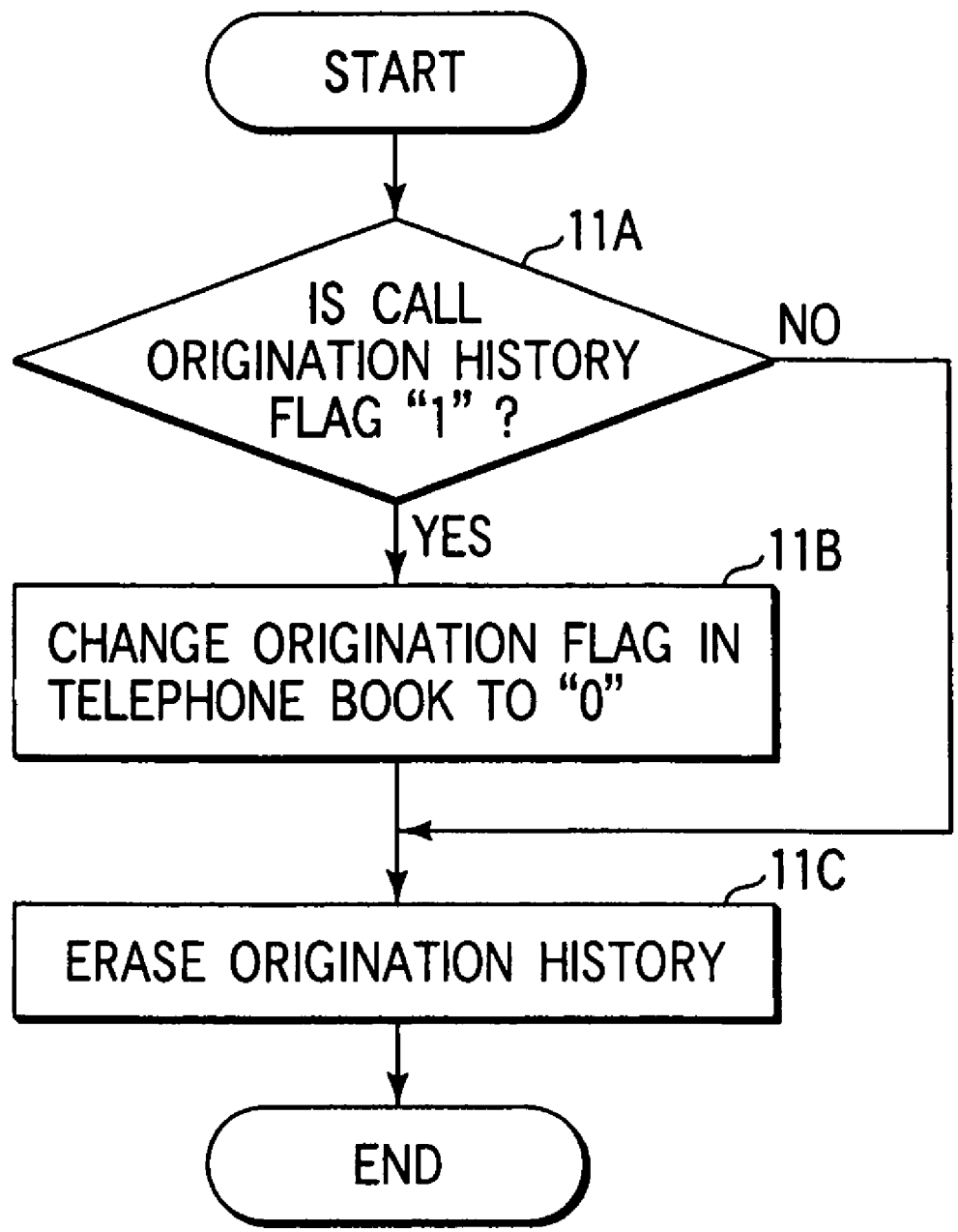
FIG. 11 is a flowchart for showing the processing for deleting a call origination history of the communication device of the embodiment.

The following will describe the processing for automatically deleting the least recent call origination history when the number of the call origination histories has reached a predetermined value or for deleting an unnecessary call origination history in accordance with an instruction from the user. FIG. 11 is a flowchart for showing the processing which is carried out after a call origination history to be deleted is identified.

At step 11A, it is determined with reference to the call origination history storage area 60B whether the call origination history flag of a deletion objective call origination history is "1." Determination is made on whether a party related to the deletion objective call origination history is already registered in the telephone book storage area 60A (the flag is "1" when it is registered).

If the call origination history flag is "1," the flow goes to step 11B and, otherwise, goes to step 11C.

If the party related to the deletion objective call origination history is already registered in the telephone book storage area 60A (the flag is "1"), at step 11B the call origination flag in the telephone book storage area 60A that corresponds to the party is changed to "0" and the flow goes to step 11C.

At step 11C, the deletion objective call origination history is deleted from the call origination history storage area 60B and then the flow ends.

Figure 12:
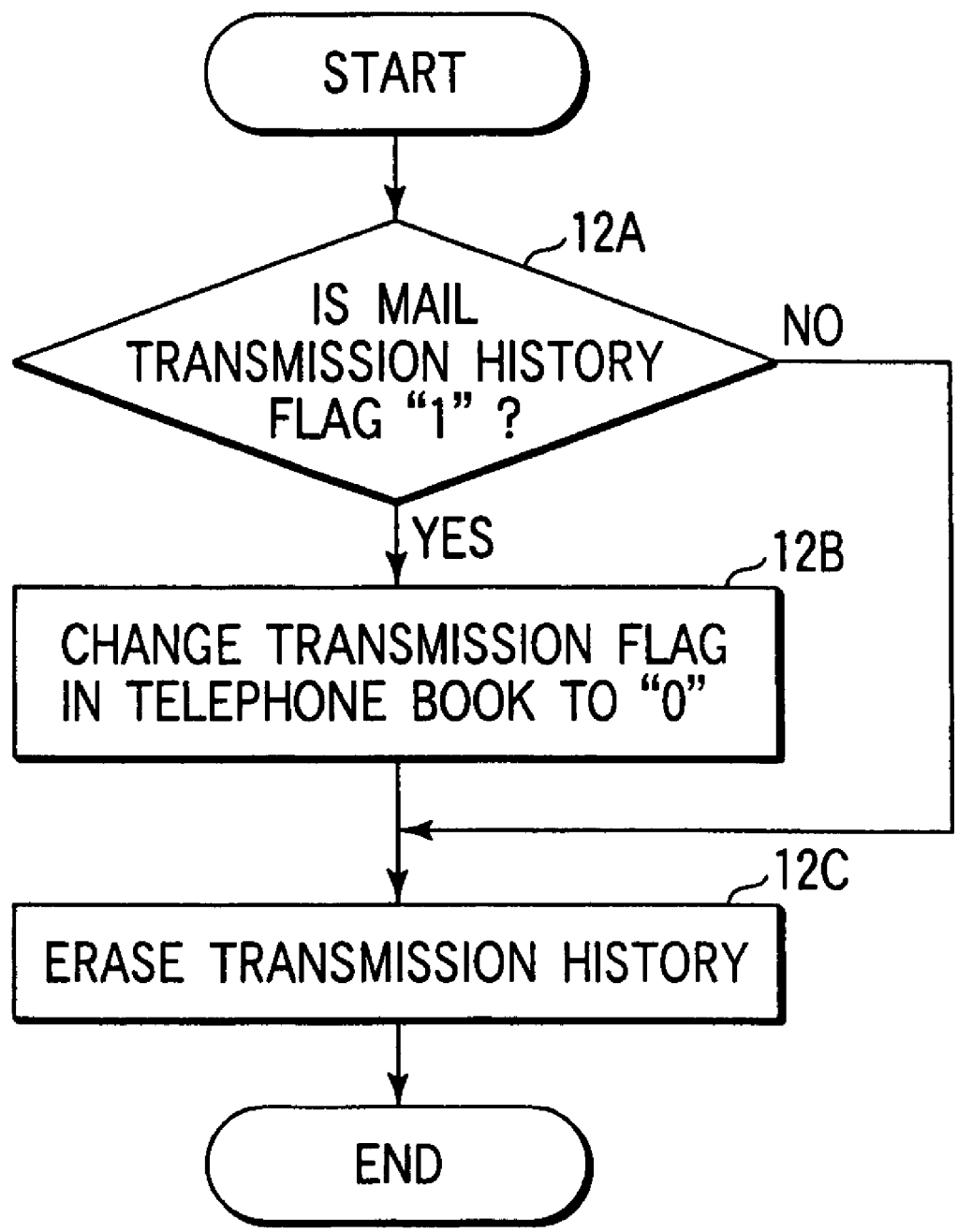
FIG. 12 is a flowchart for showing the processing for deleting a mail transmission history of the communication device of the embodiment.

The following will describe the processing for automatically deleting the least recent mail transmission history when the number of the mail transmission histories has reached a predetermined value or for deleting an unnecessary mail transmission history in accordance with an instruction from the user. FIG. 12 is a flowchart for showing the processing which is performed when a mail transmission history to be deleted is identified.

At step 12A, it is determined with reference to the mail transmission history storage area 60D whether the mail transmission history flag of a deletion objective mail transmission history is "1." Determination is made on whether a party related to the deletion objective mail transmission history is already registered in the telephone book storage area 60A (the flag is "1" when it is registered).

If the mail transmission history flag is "1," the flow goes to step 12B and, otherwise, goes to step 12C.

If the party related to the deletion objective mail transmission history is already registered in the telephone book storage area 60A (the flag is "1"), at step 12B the mail transmission flag in the telephone book storage area 60A that corresponds to the party is changed to "0" and the flow goes to step 12C.

At step 12C, the deletion objective mail transmission history is deleted from the mail transmission history storage area 60D and then the flow ends.

Figure 13:
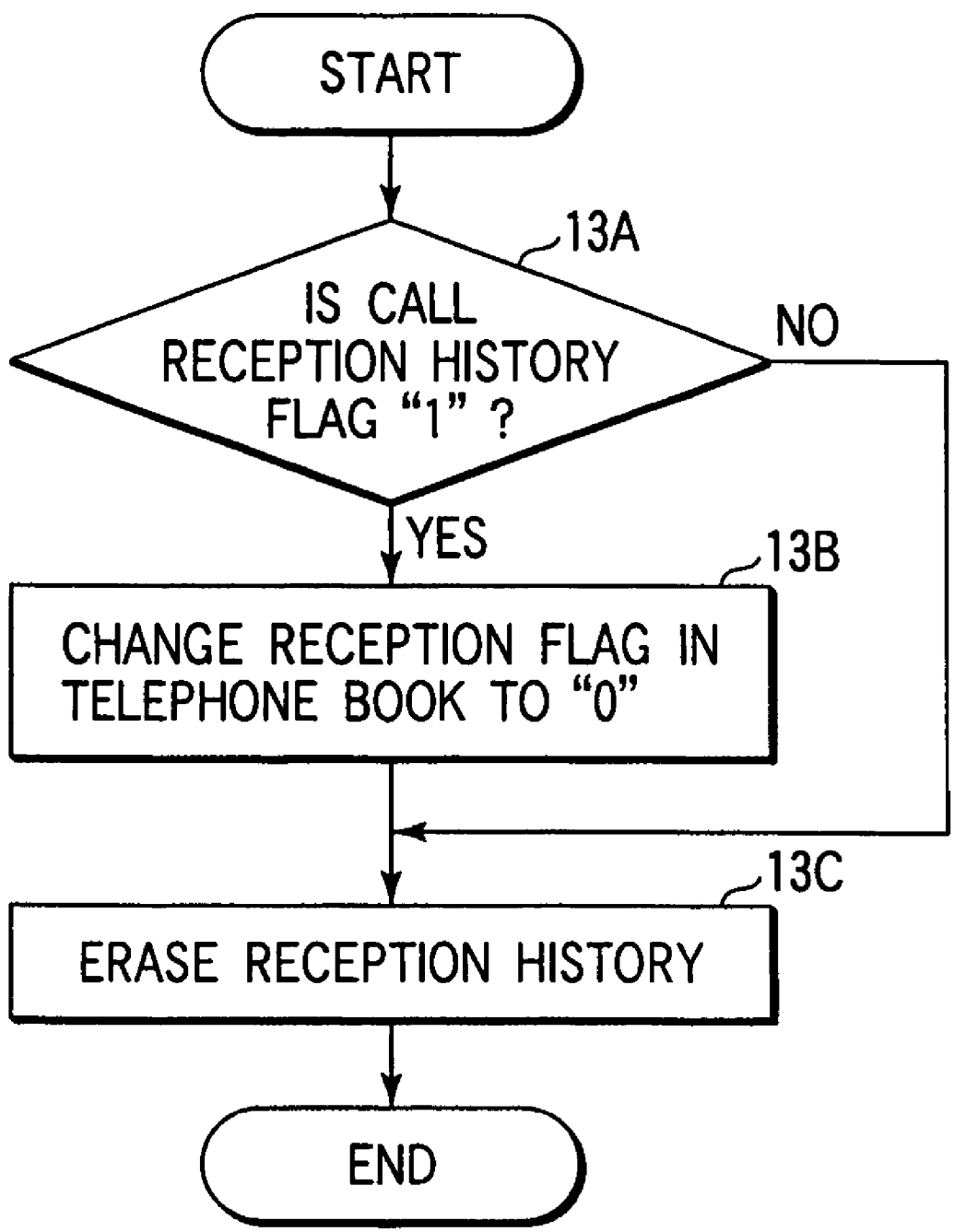
FIG. 13 is a flowchart for showing the processing for deleting a call reception history of the communication device of the embodiment.

The following will describe the processing for automatically deleting the least recent call reception history when the number of the call reception histories has reaches a predetermined value or for deleting an unnecessary call reception history in accordance with an instruction from the user. FIG. 13 is a flowchart for showing the processing which is performed after a call reception history to be deleted is identified.

At step 13A, it is determined with reference to the call reception history storage area 60C whether the call reception history flag of a deletion objective call reception history is "1." Determination is made on whether a party related to the deletion objective call reception history is already registered in the telephone book storage area 60A (the flag is "1" when it is registered).

If the call reception history flag is "1," the flow goes to step 13B and, otherwise, goes to step 13C.

If the party related to the deletion objective call reception history is already registered in the telephone book storage area 60A (the flag is "1"), at step 13B the call reception flag in the telephone book storage area 60A that corresponds to the party is changed to "0" and the flow goes to step 13C.

At step 13C, the deletion objective call reception history is deleted from the call reception history storage area 60C and then the flow ends.

The following will describe the processing for automatically deleting the least recent mail arrival history when the number of the mail arrival histories has reached a predetermined value or for deleting an unnecessary mail arrival history in accordance with an instruction from the user. FIG. 14 is a flowchart for showing the processing which is performed when a mail arrival history to be deleted is identified.

At step 14A, it is determined with reference to the mail arrival history storage area 60E whether the mail arrival history flag of a deletion objective mail arrival history is "1." Determination is made on whether a party related to the deletion objective mail arrival history is already registered in the telephone book storage area 60A (the flag is "1" when it is registered).

If the mail arrival history flag is "1," the flow goes to step 14B and, otherwise, goes to step 14C.

If the party related to the deletion objective mail arrival history is already registered in the telephone book storage area 60A (the flag is "1"), at step 14B the mail arrival flag in the telephone book storage area 60A that corresponds to the party is changed to "0" and the flow goes to step 14C.

At step 14C, the deletion objective mail arrival history is deleted from the mail arrival history storage area 60D and then the flow ends.

The following will describe the processing for rewriting a history in response to a change, if any, in the telephone book. Despite history rewriting, only the name field is rewritten, leaving the time field and telephone number/mail address field unchanged.

First the processing in a case where a name in the telephone book is changed is described. This holds true also with a case where, for example, someone's family name is changed owing to marriage. Suppose one such example that "Akiko TANAKA" is changed to "Akiko SHIMIZU" owing to marriage in a telephone book shown in FIG. 2.

Figure 15:
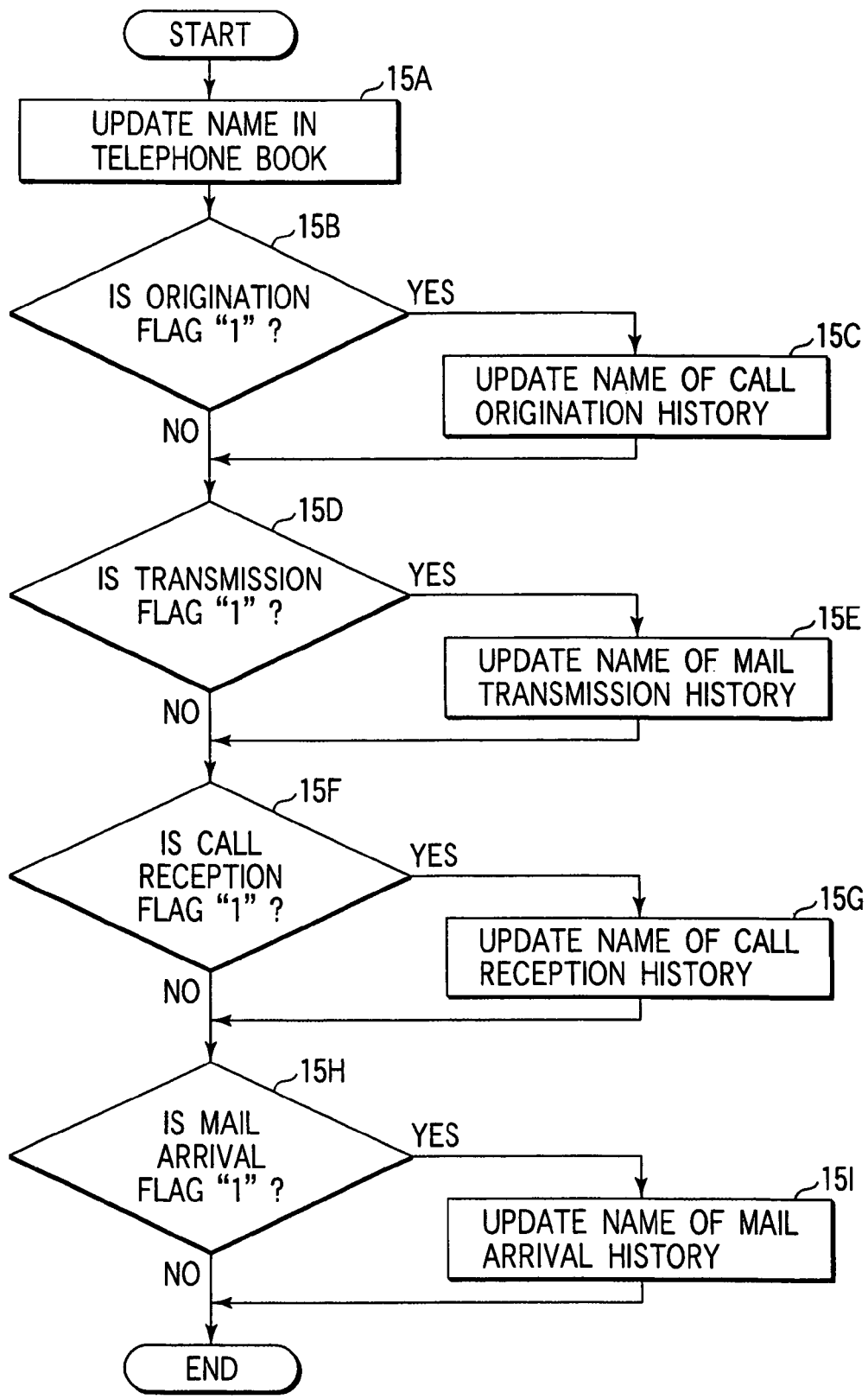
FIG. 15 is a flowchart for showing the processing carried out when a name in a telephone book of the communication device of the present invention is updated.

FIG. 15 is a flowchart for showing the processing, which is carried out in response to a request from the user for changing a name in the telephone book.

At step 15A, the key input 72 designates an update objective name "Akiko TANAKA" in the telephone book data and a new name "Akiko SHIMIZU" and the telephone book is updated as shown in FIG. 2.

At step 15B, it is determined with reference to the telephone book storage area 60A whether a call origination flag which corresponds to the name in the telephone book that is updated at step 15A is "1."

If the corresponding call origination flag is "1," the flow goes to step 15C and, otherwise, the flow goes to step 15D.

At step 15C, a call origination history in the call origination history storage area 60B that includes a telephone number of the update objective name is detected and the name of the detected call origination history is updated to "Akiko SHIMIZU" as shown in FIG. 3 and then the flow goes to step 15D.

At step 15D, it is determined with reference to the telephone book storage area 60A whether a mail transmission flag which corresponds to the name in the telephone book that is updated at step 15A is "1."

If the corresponding mail transmission flag is "1," the flow goes to step 15E and, otherwise, the flow goes to step 15F.

At step 15E, a mail transmission history in the mail transmission history storage area 60D that includes a telephone number of the update objective name is detected and the name of the detected mail transmission history is updated and then the flow goes to step 15F.

At step 15F, it is determined with reference to the telephone book storage area 60A whether a call reception flag which corresponds to the name in the telephone book that is updated at step 15A is "1."

If the corresponding call reception flag is "1," the flow goes to step 15G and, otherwise, the flow goes to step 15H.

At step 15G, a call reception history in the call reception history storage area 60C that includes a telephone number of the update objective name is detected and the name of the detected call reception history is updated and then the flow goes to step 15H.

At step 15H, it is determined with reference to the telephone book storage area 60A whether a mail arrival flag which corresponds to the name in the telephone book that is updated at step 15A is "1."

If the corresponding mail arrival flag is "1," the flow goes to step 15I and, otherwise, the flow ends.

At step 15I, a mail arrival history in the mail arrival history storage area 60E that includes a telephone number of the update objective name is detected and the name of the detected mail arrival history is updated and then the flow ends.

By the processing shown in FIG. 15, it is possible to, when a name in the telephone book is changed, change a name of the history having the telephone number or mail address corresponding to the changed name. This makes it possible to reflect a change in the telephone book on the history, thus facilitating call origination or mail transmission based on the history.

The following will describe the processing which is performed when a new telephone number or mail address is newly registered in the telephone book. FIG. 16 is a flowchart for showing this processing, which is executed in response to a request from the user for registering new data.

At step 16A, the key input 72 inputs new data including a name "Kazuo KATOH" and his telephone number and mail address and these items of data are registered in the telephone book as one item of telephone book data as shown in FIG. 2.

At step 16B, it is determined with reference to the call origination history storage area 60B whether there is any call origination history that contains the same telephone number as that in the new telephone book data item registered at step 16A.

If that is the case, the flow goes to step 16C and, otherwise, goes to step 16D.

At step 16C, the name of the determined call origination history in the call origination history storage area 60B is changed to the name of the new telephone book data item as shown in FIG. 3 and the corresponding call origination history flag is changed to "1." Furthermore, a call origination flag in the telephone book storage area 60A that corresponds to the newly registered telephone book data item is set to "1" as shown in FIG. 2 and the flow goes to step 16D.

Suppose, for example, that "Kazuo KATOH" is registered newly. Since his telephone number "0355555555" is already present in the call origination history storage area 60B (FIG. 3), at step 16C, "Kazuo KATOH" is written into a hitherto empty name field in the call origination history that corresponds to the telephone number "0355555555."

At step 16D, it is determined with reference to the mail transmission history storage area 60D whether there is any mail transmission history that contains the same telephone number as that in the new telephone book data item registered at step 16A.

If that is the case, the flow goes to step 16E and, otherwise, goes to step 16F.

At step 16E, the name of the determined mail transmission history in the mail transmission history storage area 60D is changed to the name of the new telephone book data item and the corresponding mail transmission history flag is changed to "1." Furthermore, a mail transmission flag in the telephone book storage area 60A that corresponds to the newly registered telephone book data item is set to "1" and the flow goes to step 16F.

At step 16F, it is determined with reference to the call reception history storage area 60C whether there is any call reception history that contains the same telephone number as that in the new telephone book data item registered at step 16A.

If that is the case, the flow goes to step 16G and, otherwise, goes to step 16H.

At step 16G, the name of the determined call reception history in the call reception history storage area 60C is changed to the name of the new telephone book data item and the corresponding call reception history flag is changed to "1." Furthermore, a call reception flag in the telephone book storage area 60A that corresponds to the newly registered telephone book data item is set to "1" and the flow goes to step 16H.

At step 16H, it is determined with reference to the mail arrival history storage area 60E whether there is any mail arrival history that contains the same telephone number as that in the new telephone book data item registered at step 16A.

If that is the case, the flow goes to step 16I and, otherwise, ends.

At step 16I, the name of the determined mail arrival history in the mail arrival history storage area 60E is changed to the name of the new telephone book data item and the corresponding mail arrival history flag is changed to "1." Furthermore, a mail arrival flag in the telephone book storage area 60A that corresponds to the newly registered telephone book data item is set to "1" and the flow ends.

By the processing shown in FIG. 16, when new data is registered in the telephone book and if there is a history of past communication with a relevant person, it is possible to reflect a name registered in a hitherto empty name field in this history. This makes it possible to know the party's name from the displayed history, thus facilitating call origination or mail transmission based on the displayed history.

Figure 17:
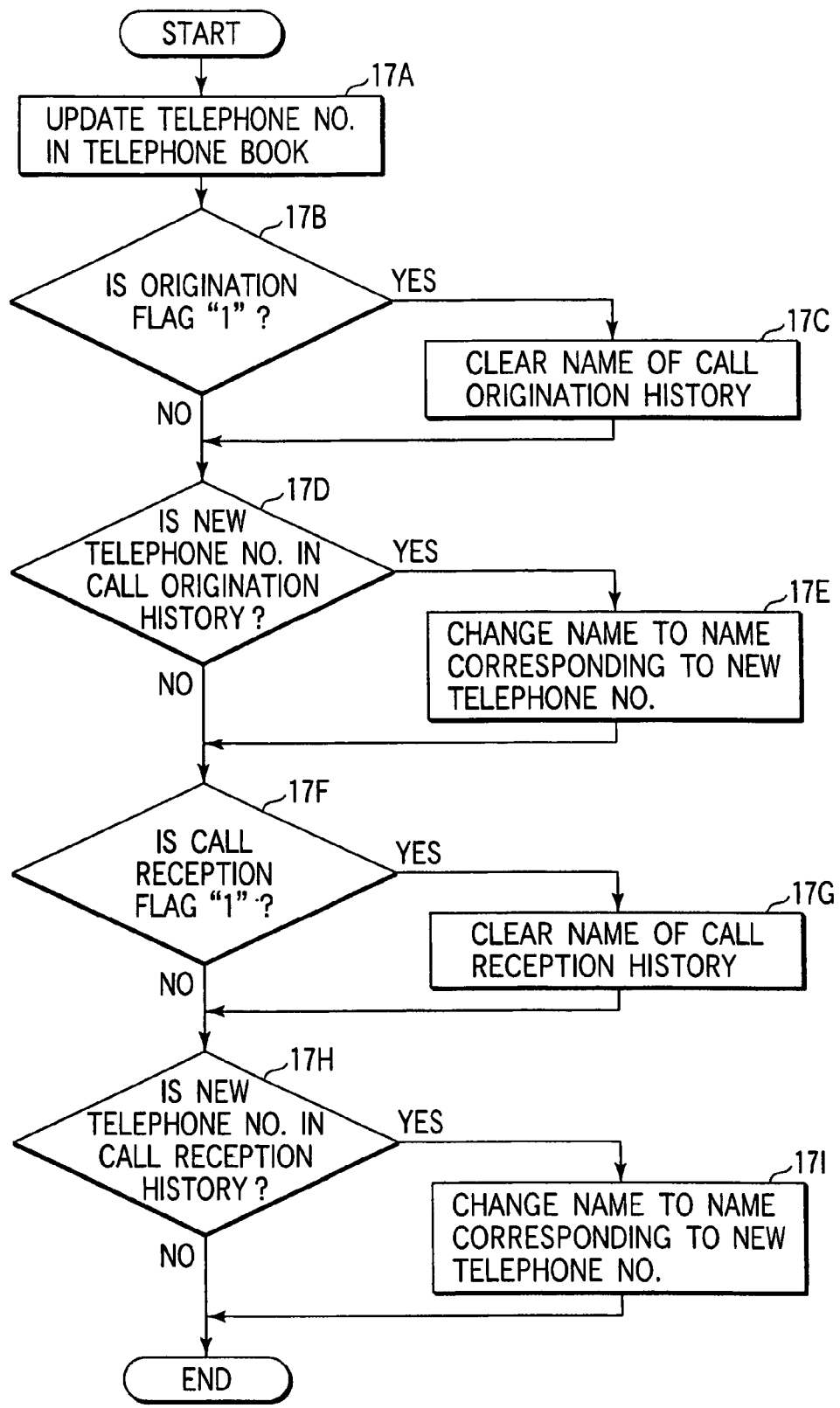
FIG. 17 is a flowchart for showing the processing carried out when a telephone number in the telephone book of the communication device of the embodiment is updated.

The following will describe the processing which is performed when a party's telephone number is changed to then change it in the telephone book. FIG. 17 is a flowchart for showing this processing, which is performed in response to a request from the user for changing the telephone number.

At step 17A, the key input 72 designates an update objective telephone book data item and a new telephone and the telephone book is updated. Suppose, for example, that a telephone number "09012345678" of "Tarou SATOH" in the telephone book storage area 60A is changed to "09012345677" as shown in FIG. 2.

At step 17B, it is determined with reference to the telephone book storage area 60A whether a call origination flag that corresponds to the update objective telephone book data item is "1."

If the corresponding call origination flag is "1," the flow goes to step 17C and, otherwise, goes to step 17D.

At step 17C, a call origination history in the call origination history storage area 60B that includes a name of the update objective telephone book data item is detected and the name of the detected call origination history is cleared as shown in FIG. 3 and the call origination history flag is changed to "0." This step erases a history of call origination for "Tarou SATOH." If this history is left non-erased, a call is mistakenly originated for his old telephone number of "09012345678" left in the displayed history. Thus, the call is not originated for "Tarou SATOH" of "09012345677."

Further, a call origination flag in the telephone book storage area 60A that corresponds to the update objective telephone book data item is changed to "0" and the flow goes to step 17D.

At step 17D, it is determined with reference to the call origination history storage area 60B whether there is any call origination history that contains the same telephone number as that in the telephone book data item updated at step 17A.

If that is the case, the flow goes to step 17E and, otherwise, goes to step 17F.

At step 17E, the name of the determined call origination history in the call origination history storage area 60B is changed to the name of the updated telephone book data item and the corresponding call origination history flag is changed to "1." Furthermore, a call origination flag in the telephone book storage area 60A that corresponds to the updated telephone book data item is set to "1" as shown in FIG. 3 and the flow goes to step 17F.

At step 17F, it is determined with reference to the telephone book storage area 60A whether a call reception flag that corresponds to the updated telephone book data item is "1."

If the corresponding call reception flag is "1," the flow goes to step 17G and, otherwise, goes to step 17H.

At step 17G, a call reception history in the call reception history storage area 60C that includes a name of the updated telephone book data item is detected and the name of the detected call reception history is cleared and the call reception history flag is changed to "0."

Further, a call reception flag in the telephone book storage area 60A that corresponds to the updated telephone book data item is changed to "0" and the flow goes to step 17H.

At step 17H, it is determined with reference to the call reception history storage area 60C whether there is any call reception history that contains the same telephone number as that in the updated telephone book data item.

If that is the case, the flow goes to step 17I and, otherwise, ends.

At step 17I, the name of the determined call reception history in the call reception history storage area 60C is changed to the name of the updated telephone book data item and the corresponding call reception history flag is changed to "1." Furthermore, a call reception flag in the telephone book storage area 60A that corresponds to the updated telephone book data item is set to "1" and the flow ends.

The processing shown in FIG. 17 is executed to, when a someone's telephone number is changed, delete the name field from a history related to the old telephone number and, if a new telephone number is present in the history, rewrite the name field in this history. This makes it possible to correctly originate a call by designating a party included in the history display screen.

Figure 18:
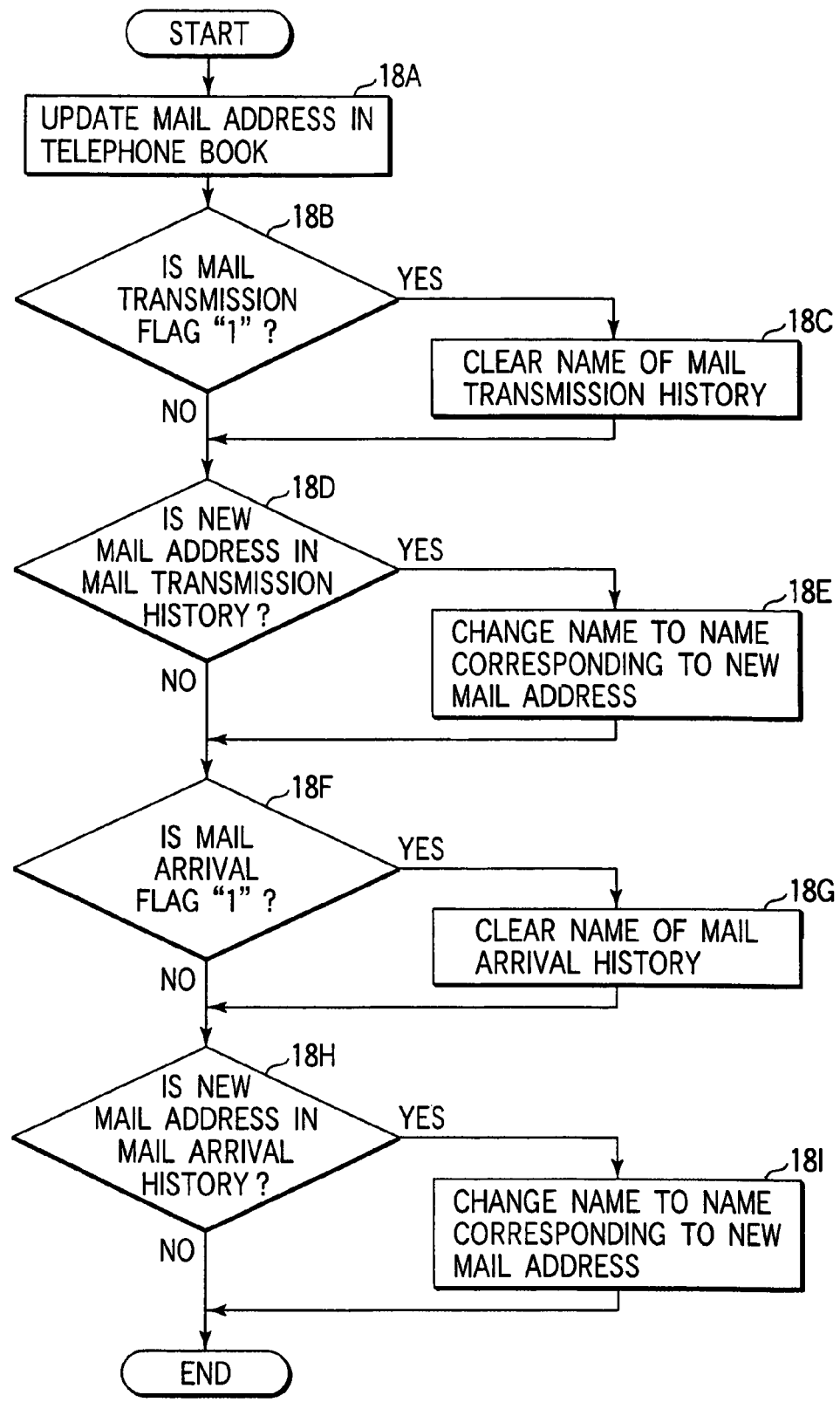
FIG. 18 is a flowchart for showing the processing carried out when an electronic mail address in the telephone book of the communication device of the embodiment is updated.

The following will describe the processing which is performed when a party's mail address is changed to then change it in the telephone book. FIG. 18 is a flowchart for showing this processing, which is performed in response to a request from the user for changing the mail address.

At step 18A, the key input 72 designates an update objective telephone book data item and a new mail address and the telephone book is updated.

At step 18B, it is determined with reference to the telephone book storage area 60A whether a mail transmission flag that corresponds to the update objective telephone book data item is "1."

If the corresponding mail transmission flag is "1," the flow goes to step 18C and, otherwise, goes to step 18D.

At step 18C, a mail transmission history in the mail transmission history storage area 60D that includes a name of the update objective telephone book data item is detected and the name of the detected mail transmission history is cleared and the mail transmission history flag is changed to "0."

Further, a mail transmission flag in the telephone book storage area 60A that corresponds to the update objective telephone book data item is changed to "0" and the flow goes to step 18D.

At step 18D, it is determined with reference to the mail transmission history storage area 60D whether there is any mail transmission history that contains the same mail address as that in the telephone book data item updated at step 18A.

If that is the case, the flow goes to step 18E and, otherwise, goes to step 18F.

At step 18E, the name of the determined mail transmission history in the mail transmission history storage area 60D is changed to the name of the updated telephone book data item and the corresponding mail transmission history flag is changed to "1." Furthermore, a mail transmission flag in the telephone book storage area 60A that corresponds to the updated telephone book data item is set to "1" and the flow goes to step 18F.

At step 18F, it is determined with reference to the telephone book storage area 60A whether a mail arrival flag that corresponds to the updated telephone book data item is "1."

If the corresponding mail arrival flag is "1," the flow goes to step 18G and, otherwise, goes to step 18H.

At step 18G, a mail arrival history in the mail arrival history storage area 60E that includes a name of the updated telephone book data item is detected and the name of the detected mail arrival history is cleared and the mail arrival history flag is changed to "0."

Further, a mail arrival flag in the telephone book storage area 60A that corresponds to the updated telephone book data item is changed to "0" and the flow goes to step 18H.

At step 18H, it is determined with reference to the mail arrival history storage area 60E whether there is any mail arrival history that contains the same mail address as that in the updated telephone book data item.

If that is the case, the flow goes to step 18I and, otherwise, ends.

At step 18I, the name of the determined mail arrival history in the mail arrival history storage area 60E is changed to the name of the updated telephone book data item and the corresponding mail arrival history flag is changed to "1." Furthermore, a mail arrival flag in the telephone book storage area 60A that corresponds to the updated telephone book data item is set to "1" and the flow ends.

The processing shown in FIG. 18 is executed to, when a someone's mail address is changed, delete the name field from a history related to the old mail address and, if a new mail address is present in the history, rewrite the name field in this history. This makes it possible to correctly transmit a mail by designating a party included in the history display screen.

According to the mobile communication device of this embodiment, when a call origination/reception history or a mail transmission/arrival history is created with regard to a communication party whose telephone number or electronic mail address is registered in the telephone book, the processing shown in FIGS. 7-10 is executed to record a flag which indicates the presence of a history corresponding to the telephone book data item of the communication party.

When a call origination/reception history or a mail transmission/arrival history is deleted, the processing shown in FIGS. 11-14 is executed to record, in place of the flag set by the processing shown in FIGS. 7-10, a flag which indicates the non-presence of a history corresponding to the telephone book data item of the communication party relating to the deleted history.

When a name of the telephone book is changed, the processing shown in FIG. 15 is executed to determine whether there is a history which contains a name that needs to be changed on the basis of the flag set in the processing shown in FIGS. 7-10 and then update the corresponding name in the history to a changed name.

Therefore, even when a name of the telephone book is changed, a name in the corresponding history is also changed, so that the history is always maintained correct, thus improving the convenience for originating a call or transmitting a mail based on the history display screen.

Note here that the flag indicating the presence/non-presence of a history is dispensable in the telephone book, so that upon change of the telephone book, the history data may all be retrieved.

Furthermore, when telephone book is newly registered, the processing shown in FIG. 16 is executed to change a name in a history which corresponds to the newly registered telephone number or electronic mail address to a newly registered name.

Therefore, even when a telephone book data item is newly registered, a name in a history which corresponds to the newly registered telephone number or electronic mail address is also changed, so that the history is maintained correct, thus improving the convenience for originating a call or transmitting a mail based on the history display screen.

Figure 7:
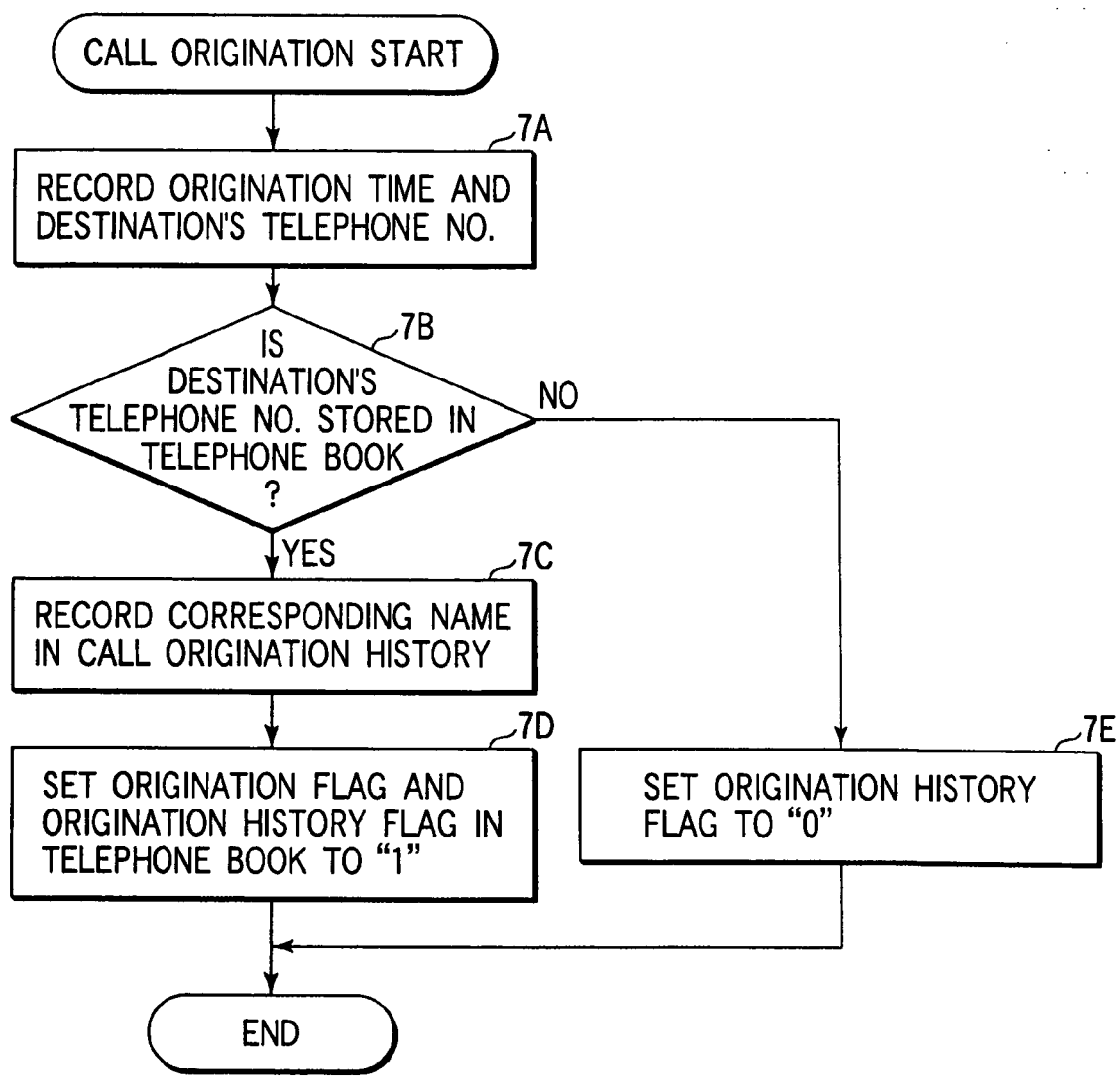
FIG. 7 is a flowchart for showing the processing carried out when a call is originated from the communication device of the embodiment.
Figure 9:
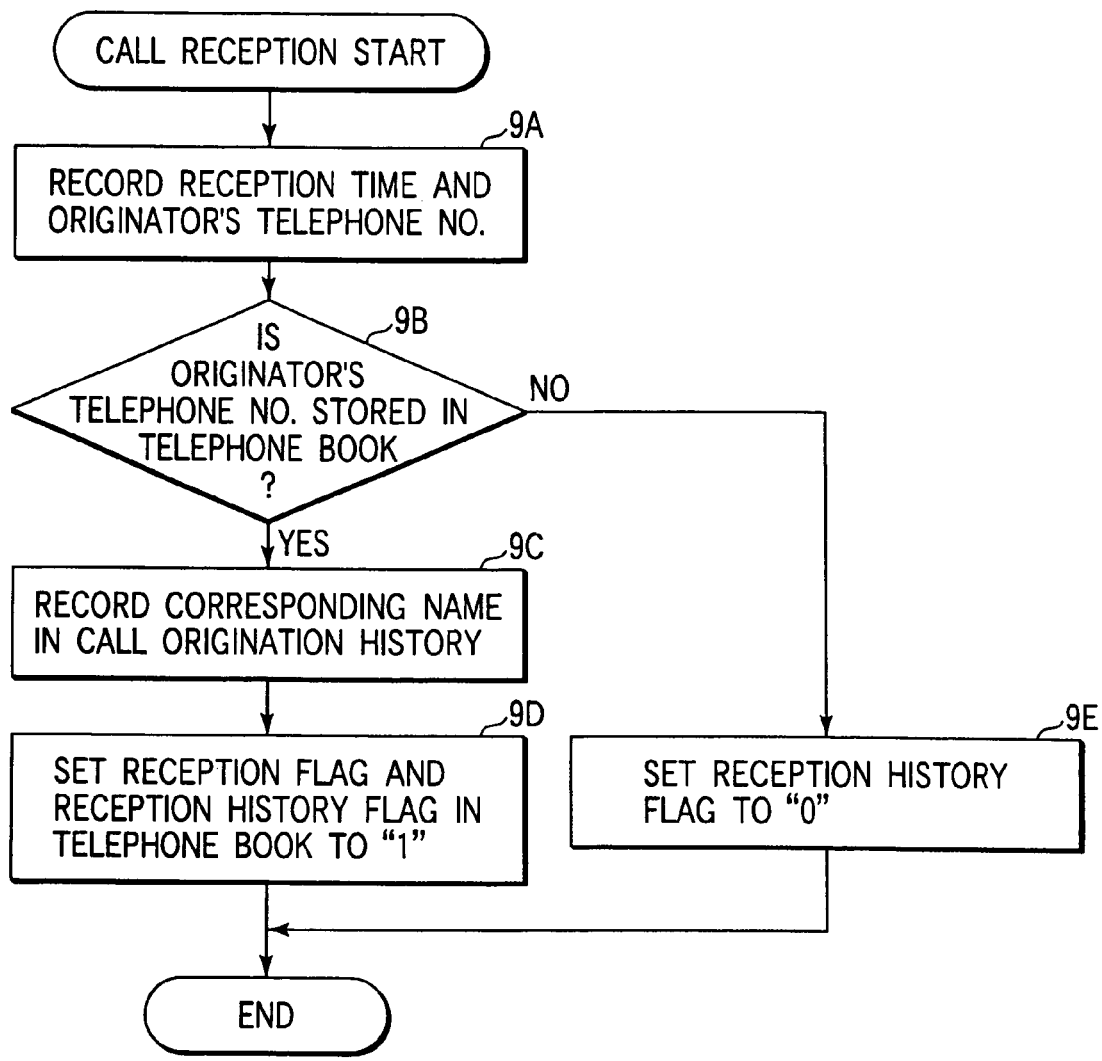
FIG. 9 is a flowchart for showing the processing carried out when a call is received at the communication device of the embodiment.

When a telephone number in the telephone book is changed, the processing shown in FIG. 17 is executed to determine whether there is a call origination/reception history which contains a name that needs to be cleared on the basis of the flag set in the processing shown in FIG. 7 or 9 and clear this name in the history and also change a name in the history that corresponds to the changed telephone number to a name in the telephone book that corresponds to the changed telephone number.

Therefore, even when a telephone number in the telephone book is changed, the corresponding name in the history is erased and also a name in the history that corresponds to the changed telephone number is changed to a name in the telephone book that corresponds to the changed telephone number, thus maintaining the history correct.

This makes it possible to originate a call to a desired party even based on a history, thus improving the convenience.

Figure 8:
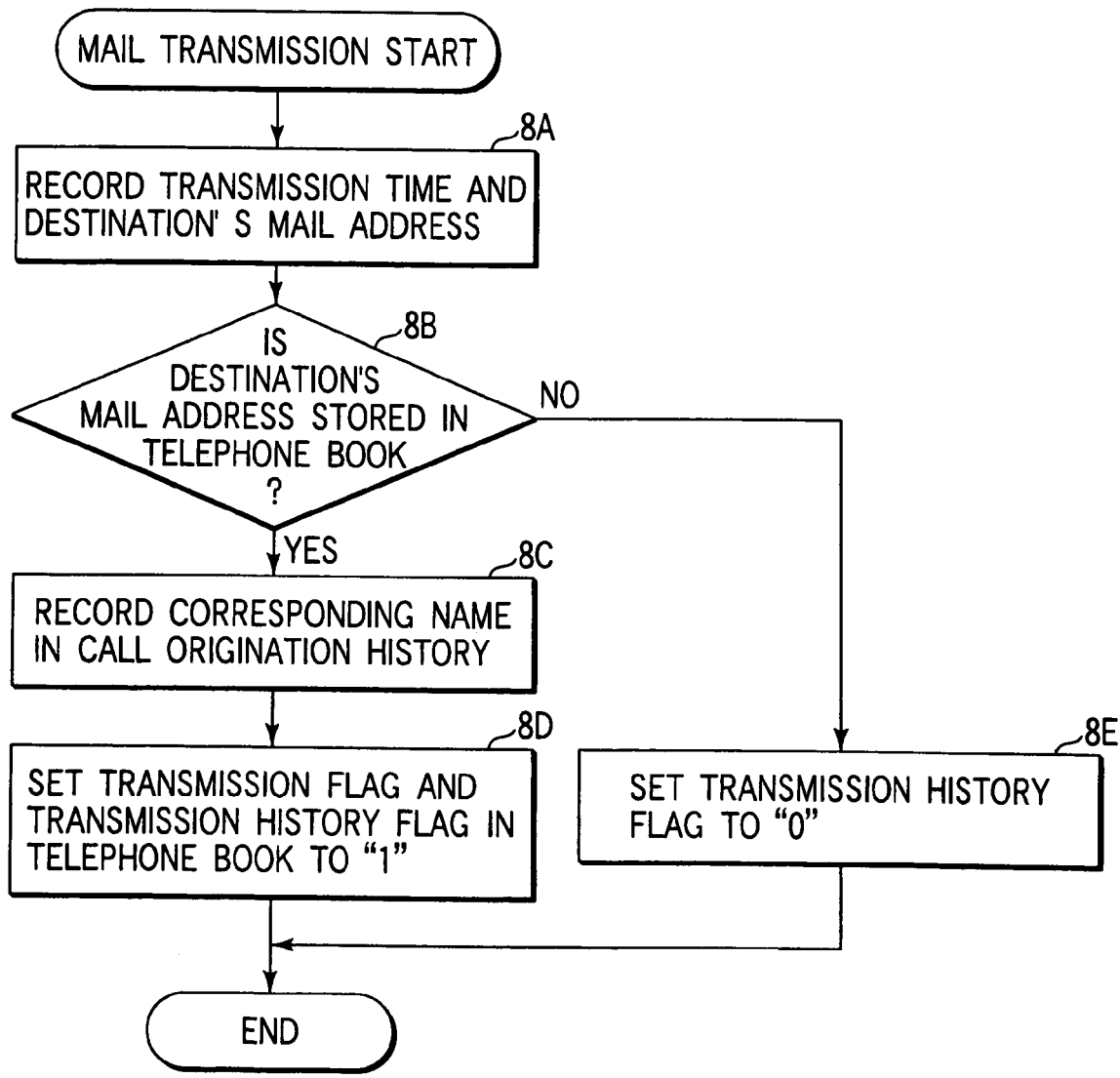
FIG. 8 is a flowchart for showing the processing carried out when a mail is transmitted from the communication device of the embodiment.
Figure 10:
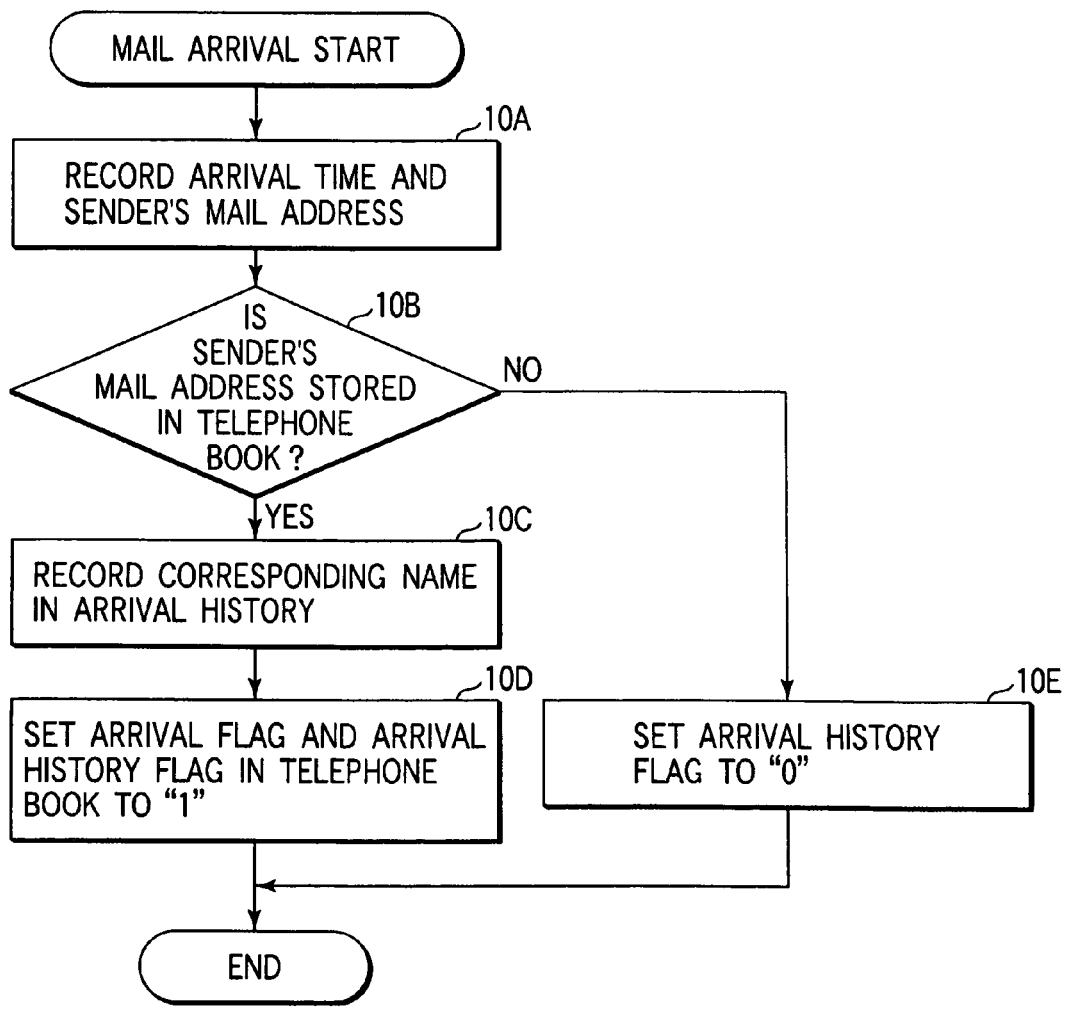
FIG. 10 is a flowchart for showing the processing carried out when a mail is arrived at the communication device of the embodiment.

Furthermore, when an electronic mail address in the telephone book is changed, the processing shown in FIG. 18 is executed to determine whether there is a mail transmission/arrival history which contains a name that needs to be cleared on the basis of the flag set in the processing shown in FIG. 8 or 10 and clear the corresponding name in the history and also change a name in the history that corresponds to the changed electronic mail address to a name in the telephone book that corresponds to the changed electronic mail address.

Therefore, even when an electronic mail address in the telephone book is changed, the corresponding name in the history is erased and also a name in the history that corresponds to the changed electronic mail address is changed to a name in the telephone book that corresponds to the changed electronic mail address, thus maintaining the history information correct.

This makes it possible to transmit an electronic mail to a desired party even based on a history, thus improving the convenience.

As described above, a communication device of this embodiment comprises a communication history storage area configured to store communication history information including at least communication party's identification information and the corresponding name which are associated to each other; an identification information storage area configured to store the name and the identification information which are associated to each other; and a name setting section which, when a name stored in the identification information storage area is changed, detects communication history information having the same identification information as that of a communication party having this changed name, and changes a name of thus detected communication history information to the changed name.

Therefore, even when a name stored in the identification information storage area is changed, the corresponding identification information's name is also changed in the communication history information to thereby maintain the communication history information correct, thus improving the convenience.

A communication device of this embodiment comprises a communication history storage area configured to store communication history information including at least communication party's identification information and the corresponding name which are associated to each other; an identification information storage area configured to store the name and the identification information which are associated to each other; and a name setting section which, when communication party information is newly added to the identification information storage area, detects communication history information having the same identification information as that of the communication party information, and sets a name of the detected communication history information to the newly recorded name.

Therefore, even when communication party information is newly recorded in the identification information storage area, the corresponding identification information's name is also set in the communication history to thereby maintain the communication history information correct, thus improving the convenience.

A communication device of this embodiment comprises a communication history storage area configured to store communication history information including at least communication party's identification information and the corresponding name which are associated to each other; an identification information storage area configured to store the name and the identification information which are associated to each other; and a name setting section which, when identification information stored in the identification information storage area is changed, detects communication history information having the same identification information as that before the change, and erases a name of the detected communication history information.

Therefore, even when identification information stored in the identification information storage area is changed, a name corresponding to the identification information before the change is also erased in the communication history to thereby prevent origination and transmission based on a wrong communication history, thus improving the convenience.

A communication device of this embodiment comprises a communication history storage area configured to store communication history information including at least communication party's identification information and the corresponding name which are associated to each other; an identification information storage area configured to store the name and the identification information which are associated to each other; and a name setting section which, when identification information stored in the identification information storage area is changed, detects communication history information having the same identification information as the changed identification information, and sets the name of the detected communication history information to a name that corresponds to the changed identification information.

Therefore, even when identification information stored in the identification information section is changed, a name corresponding to the changed identification information is also changed in the communication history to thereby maintain the communication history correct and also communicate with a desired party even by call origination or mail transmission based on a communication history, thus improving the convenience.

While the description above refers to a particular embodiment of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the present invention being indicated by the appended claims, rather than the foregoing description, and all changes the come within the meaning and range of equivalency of the claims are therefore intended to be embraced therein. For example, in the above-mentioned embodiment, a description has been made with reference to a mobile communication device as a portable telephone system, but the present invention is not limited thereto; for example, the present invention is applicable also to a radio system that transmits and receives communication party identification information over a radio communication network, giving similar effects.

Furthermore, the present invention is applicable to a wired public telephone network because it is capable of transmitting and receiving communication party identification information, thus giving similar effects.

Further, although this embodiment has been described with reference to an electronic mail, the present invention is not limited thereto; for example, the present invention is applicable to an information communication system that can add identification information over a communication network to information to be transmitted, thus giving similar effects.

Moreover, the present invention can also be implemented as a computer readable recording medium in which a program for allowing a computer to execute predetermined means, allowing the computer to function as predetermined means, or allowing the computer to realize a predetermined function is recorded.

What is claimed is:

1. A communication device comprising:
a phonebook configured to store a plurality of phonebook items, each phonebook item including identification information and a name of a communication party;
a communication history configured to store a plurality of communication history items, each communication history item including identification information and a name of a communication party;
a changing device configured to change a content of a first phonebook item; and
a control device configured to, if said changing device changes a content of the first phonebook item with first identification information, automatically change a content of a first communication history item having the first identification information and corresponding to the first phonebook item in accordance with the changed content of the first phonebook item,
wherein the plurality of phonebook items and the plurality of communication history items are stored in the communication device.

2. The communication device according to claim 1, wherein if a name in the first phonebook item is changed to a second name, said control device changes a name of a communication history item having the same identification information as the identification information of the first phonebook item to the second name.

3. The communication device according to claim 1, wherein if a second phonebook item including a second name and second identification is added to the phonebook, said control device changes a name of a communication history item having the second identification information to the second name.

4. The communication device according to claim 1, wherein if identification information of the first phonebook item is changed to a second identification information, said control device deletes a name of a communication history item having the identification information of the first phonebook item.

5. The communication device according to claim 1, wherein if identification information of the first phonebook item is changed to a second identification information, said control device changes a name of a communication history item having the second identification information to a name of a phonebook item having the second identification information.

6. The communication device according to claim 1, wherein said phonebook item further includes a first flag indicating whether a communication history item relating to the communication party is stored in said communication history, and said control device determines based on the first flag whether the communication history item to be changed is stored in said communication history.

7. The communication device according to claim 1, wherein the identification information comprises a telephone number.

8. The communication device according to claim 1, wherein the identification information comprises an electronic mail address.

9. A telephone device comprising:
a phonebook configured to store telephone numbers and party names, each telephone number associating with each party name;
a detecting device configured to detect a telephone number associated with a call;
a call history configured to store the detected telephone number and the party name associated with the detected telephone number;
a changing device configured to change a content of the phonebook; and
a control device configured to, if said changing device changes the content of the phonebook associated with the telephone number, automatically change a content of the call history associated with the telephone number in accordance with the changed content of the phonebook,
wherein the content of the phone book and the content of the call history are stored in the telephone device.

10. A telephone device comprising:
a phonebook configured to store telephone numbers and party names, each telephone number associating with each party name;
a detecting device configured to detect a telephone number associated with a call;
a call history configured to store the detected telephone number and the party name associated with the detected telephone number;
a changing device configured to change a first telephone number of the phonebook to a second telephone number; and
a control device configured to, if said changing device changes the first telephone number of the phonebook to the second telephone number, automatically change a telephone number of the call history associated with a party name associated with the first telephone number of the phonebook to the second telephone number,
wherein the telephone numbers and party names of the phonebook and the detected telephone number and the party name of the call history are stored in the telephone device.

11. A communication method comprising:
storing a plurality of phonebook items, each phonebook item including identification information and a name of a communication party;
storing a plurality of communication history items, each communication history item including identification information and a name of a communication party; and
automatically changing, if a content of a first phonebook item with first identification information is changed, a content of a first communication history item having the first identification information and corresponding to the first phonebook item in accordance with the changed content of the first phonebook item,
wherein the plurality of phonebook items and the plurality of communication history items are stored in the communication device.

12. The communication method according to claim 11, wherein if a name in the first phonebook item is changed to a second name, a name of a communication history item having the same identification information as the identification information of the first phonebook item is changed to the second name.

13. The communication method according to claim 11, wherein if a second phonebook item including a second name and second identification is added to the phonebook, a name of a communication history item having the second identification information is changed to the second name.

14. The communication method according to claim 11, wherein if identification information of the first phonebook item is changed to a second identification information, a name of a communication history item having the identification information of the first phonebook item is deleted.

15. The communication method according to claim 11, wherein if identification information of the first phonebook item is changed to a second identification information, a name of a communication history item having the second identification information is changed to a name of a phonebook item having the second identification information.

16. The communication method according to claim 11, wherein the identification information comprises a telephone number.

17. The communication method according to claim 11, wherein the identification information comprises an electronic mail address.

18. A communication method comprising:

storing telephone numbers and party names, each telephone number associating with each party name, in a phonebook;

detecting a telephone number associated with a call;

storing the detected telephone number and the party name associated with the detected telephone number in a communication history; and automatically changing, if a content of the phonebook associated with the telephone number is changed, a content of the communication history associated with the telephone number in accordance with the changed content of the phonebook, wherein the telephone numbers and party names of the phonebook and the detected telephone number and the party name of the communication history are stored in a single communication device.

19. A communication method comprising:

storing telephone numbers and party names, each telephone number associating with each party name, in a phonebook;

detecting a telephone number associated with a call;

storing the detected telephone number and the party name associated with the detected telephone number in a communication history; and automatically changing, if a first telephone number of the phonebook is changed to the second telephone number, a telephone number of the communication history associated with a party name associated with the first telephone number of the phonebook to the second telephone number, wherein the telephone numbers and party names of the phonebook and the detected telephone number and the party name of the communication history are stored in a single communication device.

* * * * *

UNITED STATES PATENT AND TRADEMARK OFFICE
CERTIFICATE OF CORRECTION

| | | |
|---|---|---|
| PATENT NO. | : 7,894,804 B2 | Page 1 of 1 |
| APPLICATION NO. | : 11/790584 | |
| DATED | : February 22, 2011 | |
| INVENTOR(S) | : Tsukamoto | |

It is certified that error appears in the above-identified patent and that said Letters Patent is hereby corrected as shown below:

Title page
Item (73), Assignee, change "Kawsaki" to --Kawasaki--

Signed and Sealed this
Tenth Day of May, 2011

David J. Kappos
*Director of the United States Patent and Trademark Office*